(12) United States Patent
Cagliero

(10) Patent No.: US 11,491,848 B2
(45) Date of Patent: Nov. 8, 2022

(54) AIR CONDITIONING SYSTEM WITH COOLANT PRESSURE MANAGEMENT

(71) Applicant: DENSO THERMAL SYSTEMS S.P.A., Poirino (IT)

(72) Inventor: Stefano Cagliero, Poirino (IT)

(73) Assignee: DENSO THERMAT, SYSTEMS S.P.A., Turin (IT)

( * ) Notice: Subject to any disclaimer, the term of this patent is extended or adjusted under 35 U.S.C. 154(b) by 168 days.

(21) Appl. No.: 16/219,821

(22) Filed: Dec. 13, 2018

(65) Prior Publication Data
US 2019/0176576 A1    Jun. 13, 2019

(30) Foreign Application Priority Data
Dec. 13, 2017 (IT) .......... 102017000143510

(51) Int. Cl.
| | |
|---|---|
| *B60H 1/32* | (2006.01) |
| *B60H 1/00* | (2006.01) |
| *F24F 11/83* | (2018.01) |
| *F24F 11/74* | (2018.01) |
| *F24F 140/12* | (2018.01) |

(52) U.S. Cl.
CPC ....... *B60H 1/3202* (2013.01); *B60H 1/00435* (2013.01); *B60H 1/00521* (2013.01); *B60H 1/00878* (2013.01); *B60H 1/3216* (2013.01); *F24F 11/74* (2018.01); *F24F 11/83* (2018.01); *B60H 2001/325* (2013.01); *B60H 2001/3282* (2013.01); *F24F 2140/12* (2018.01)

(58) Field of Classification Search
CPC .............. B60H 1/3202; B60H 1/00435; B60H 1/00521; B60H 1/00878; B60H 1/00828; B60H 1/00864; B60H 1/3216; B60H 2001/325; B60H 2001/3282; B60H 2001/3252; F24F 11/74; F24F 11/83; F24F 11/755; F24F 11/30; F24F 11/81
See application file for complete search history.

(56) References Cited

U.S. PATENT DOCUMENTS 5,782,101 A    7/1998    Dennis

FOREIGN PATENT DOCUMENTS

| EP | 3171099 A2 | 5/2017 | |
|---|---|---|---|
| JP | 05263641 A | * 10/1993 | .............. F01P 7/048 |
| JP | H09243185 A | 9/1997 | |
| WO | 2017/073688 A1 | 5/2017 | |

OTHER PUBLICATIONS

English Machine Translation: JP 05263641: Accessed via Dialog, Sep. 2020.*
Italian Search Report in IT 201700143510 dated Aug. 7, 2018.

* cited by examiner

*Primary Examiner* — Tavia Sullens
(74) *Attorney, Agent, or Firm* — Henry J. Cittone; Cittone Demers & Arneri LLP

(57) ABSTRACT

An air conditioning system for a vehicle, having an evaporator configured for a heat exchange between a coolant and air, a fan configured to generate an air flow passing through the evaporator and intended to be fed into a vehicle passenger compartment, at least one pressure sensor configured to measure the pressure of the coolant, and a control unit to adjust the rotation speed of the fan, configured to automatically decrease the rotation speed of the fan when the detected pressure of the coolant rises above a pressure threshold, so as to reduce the air flow on the evaporator and thus reduce the pressure of the coolant is provided.

2 Claims, 5 Drawing Sheets

AIR CONDITIONING SYSTEM WITH COOLANT PRESSURE MANAGEMENT

CROSS-REFERENCE TO RELATED APPLICATION

This application claims priority to Italian Patent App. No. 102017000143510, filed Dec. 13, 2017, the disclosures of which are incorporated by reference herein in their entirety.

FIELD OF THE INVENTION

The present invention refers in general to the methods used in vehicle air conditioning systems to manage the variations in pressure of the coolant required for heat exchange with the air used for vehicle air conditioning.

BACKGROUND OF THE INVENTION

In the market of air conditioning systems for buses, the so-called shutdown temperature is one of the parameters to which the end customer pays close attention. This value indicates the maximum ambient temperature at which the bus may operate without exceeding the maximum allowable pressure of the air conditioning system. When the pressure of the coolant reaches and exceeds this maximum value (typically between 23 and 36 bar), the control system switches off the compressor of the coolant circuit to avoid damage.

One may consider, for example, a bus parked in the sun during the summer period. When the bus is started up and the driver wants to cool the passenger compartment to a more comfortable temperature for the passengers, if the pressure of the coolant reaches a value higher than the maximum value, the compressor is switched off and it is no longer possible to cool the bus. The higher the shutdown value, the less likely it is that this phenomenon will occur. Clearly, a system with a higher shutdown value is more expensive, as it has to deliver performance under more severe conditions. The shutdown temperature is determined by a test in which the system is operated under precise test conditions and the ambient temperature is increased until the moment when the shutdown occurs.

SUMMARY OF THE INVENTION

One of the objects of the present invention is to make available a system capable of controlling the pressure increase of the coolant circuit, and thus delaying the activation of the compressor shutdown as much as possible. Consequently, another object of the invention is to make available a system that, with the same features as a conventional system, allows for a higher shutdown temperature to be obtained.

For such objects, the invention concerns an air conditioning system for a vehicle, comprising an evaporator configured for heat exchange between a coolant and air, a fan configured to generate an air flow passing through the evaporator and intended to be fed into a passenger compartment of the vehicle, at least one pressure sensor configured to measure the pressure of the coolant, and a controller to adjust the speed of rotation of the fan, wherein said controller is configured to automatically decrease the rotation speed of the fan when the detected pressure of the coolant rises above a pressure threshold, so as to reduce the air flow on the evaporator.

Also object of the invention is a method for adjusting the pressure of the coolant in an air conditioning system of a vehicle, comprising measuring the pressure of the coolant, and adjusting the rotation speed of a fan generating an air flow passing through the evaporator of a circuit of the coolant, wherein adjusting the rotation speed of the fan comprises automatically decreasing the rotation speed of the fan when the detected pressure of the coolant rises above a pressure threshold, so as to reduce the air flow on the evaporator.

According to the invention, cooling performance is thus reduced to keep the pressure value of the coolant below the maximum permitted value. In this way, the air conditioning system may also work in critical conditions. The cabin cooling speed is lower than the maximum speed, but the system may operate. When the internal temperature decreases, the pressure also tends to decrease, and cooling performance may be restored. This mainly allows the system to start even in critical conditions.

According to an embodiment of the invention, a control signal provided for the adjustment of the rotation speed of the fan follows an adjustment curve with hysteresis. The system compares the average value of a signal representative of the measured pressure of the adjustment fluid, calculated over a given time interval, with the average value of the signal calculated over a prior time interval, and, on the basis of this comparison, establishes a value of the control signal according to one branch or the other of the adjustment curve. Such arrangement allows pressure fluctuations in the coolant circuit to be avoided.

Although the invention was conceived with particular reference to buses, it may also be applied to other vehicles, such as trains, subways, etc.

BRIEF DESCRIPTION OF THE DRAWINGS

Further features and advantages of the system according to the invention will become more apparent in the following detailed description of an embodiment of the invention, made with reference to the accompanying drawings, provided purely to be illustrative and non-limiting, wherein.

DETAILED DESCRIPTION OF THE INVENTION

Figure 1:
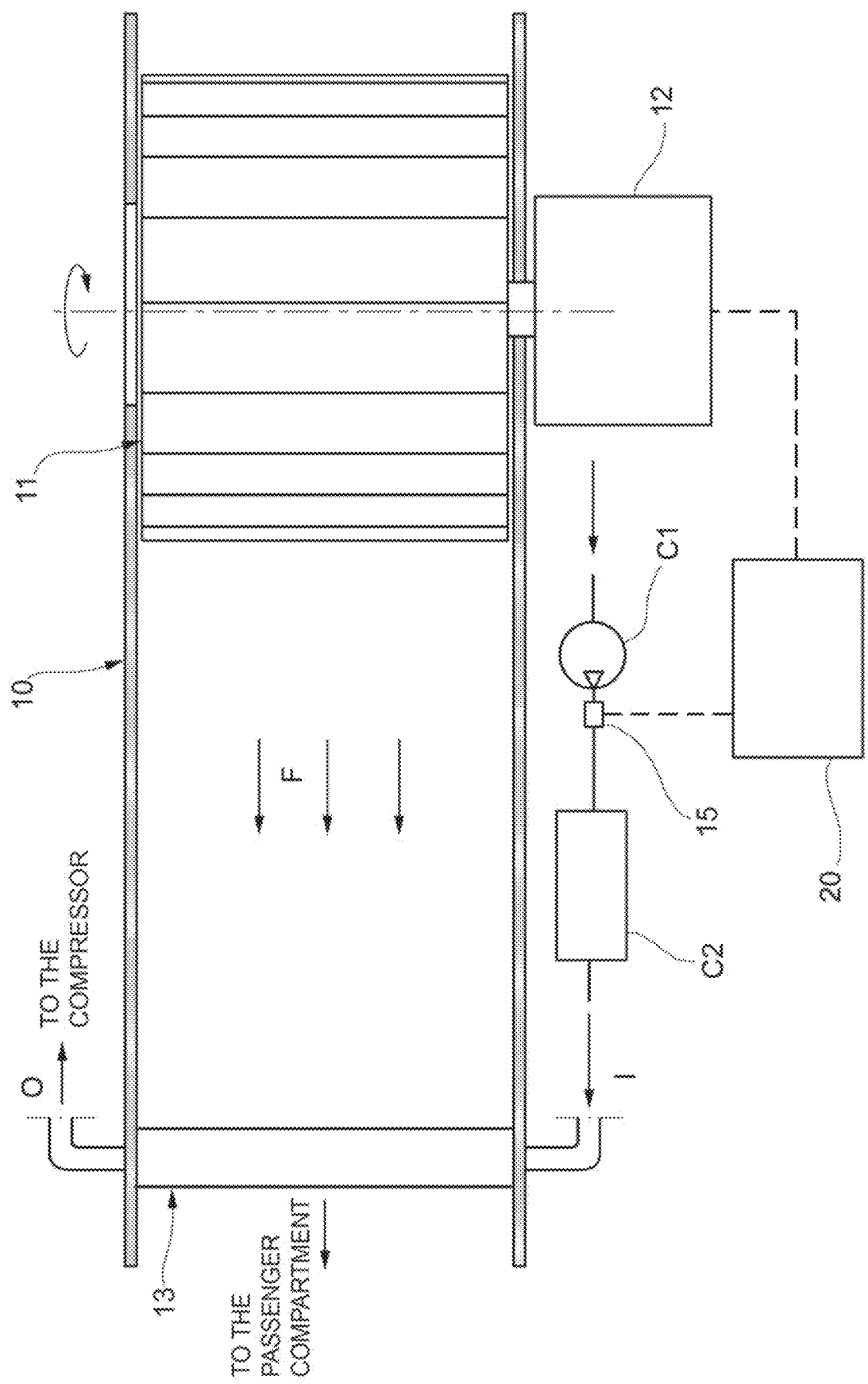
FIG. 1 is a diagram representing an air conditioning system according to the invention.

With reference to FIG. 1, an air conditioning system for a vehicle comprises a duct 10 to supply treated air to a vehicle passenger compartment, shown schematically in the figure. Along the duct 10 a fan 11 is arranged, configured to generate in the duct 10 a flow of air F to be fed into the vehicle compartment. The fan 11 (or more precisely the impeller thereof) is driven in rotation by an electric motor 12.

Along the duct 10 is further arranged an evaporator 13 configured for a heat exchange between a coolant and the air flow F passing through the evaporator 13. The evaporator 13 is part of a coolant circuit conventional per se (partially illustrated), typically comprising a compressor C1, a condenser C2 and an expansion valve. In FIG. 1, an inlet is shown at I through which the coolant coming from the coolant circuit is fed into the evaporator 13, while at 0 is represented an outlet through which the coolant returning to the fluid circuit exits from the evaporator 13.

The system further comprises at least one pressure sensor 15 configured to measure the pressure of the coolant in the relevant circuit. In particular, such sensor 15 is positioned at the outlet of the compressor C1, i.e. at the highest pressure point of the coolant circuit.

The system further comprises a control unit 20 configured to adjust the rotation speed of the fan 11, controlling the motor 12.

Figure 2:
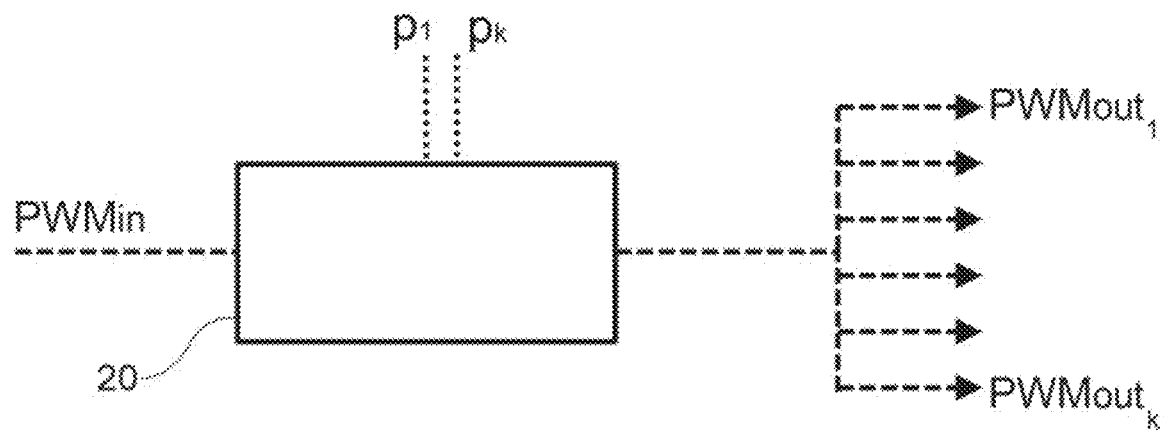
FIG. 2 is a block diagram representing a control unit of the system of FIG. 1.

With reference also to FIG. 2, a control unit 20 in charge of controlling several distinct groups numbered from 1 to K is represented, each group comprising an evaporator with a fan attached thereto. The control unit 20 is configured to receive a control signal PWMin as input indicating a fan rotation speed request, which may derive from a manual adjustment carried out by the driver or by a calculation made by the same control unit 20 on the basis of an air conditioning system control algorithm. For example, the control signal PWMin may have a value between 0 and 100%, where 0 represents the fan at a standstill and 100% represents the fan running at the maximum permitted speed.

The control unit 20 is further configured to receive as input measurement signals $p_1, \ldots, p_K$ provided by the pressure sensors respectively associated with each of the coolant circuits K of the system.

Figure 3:
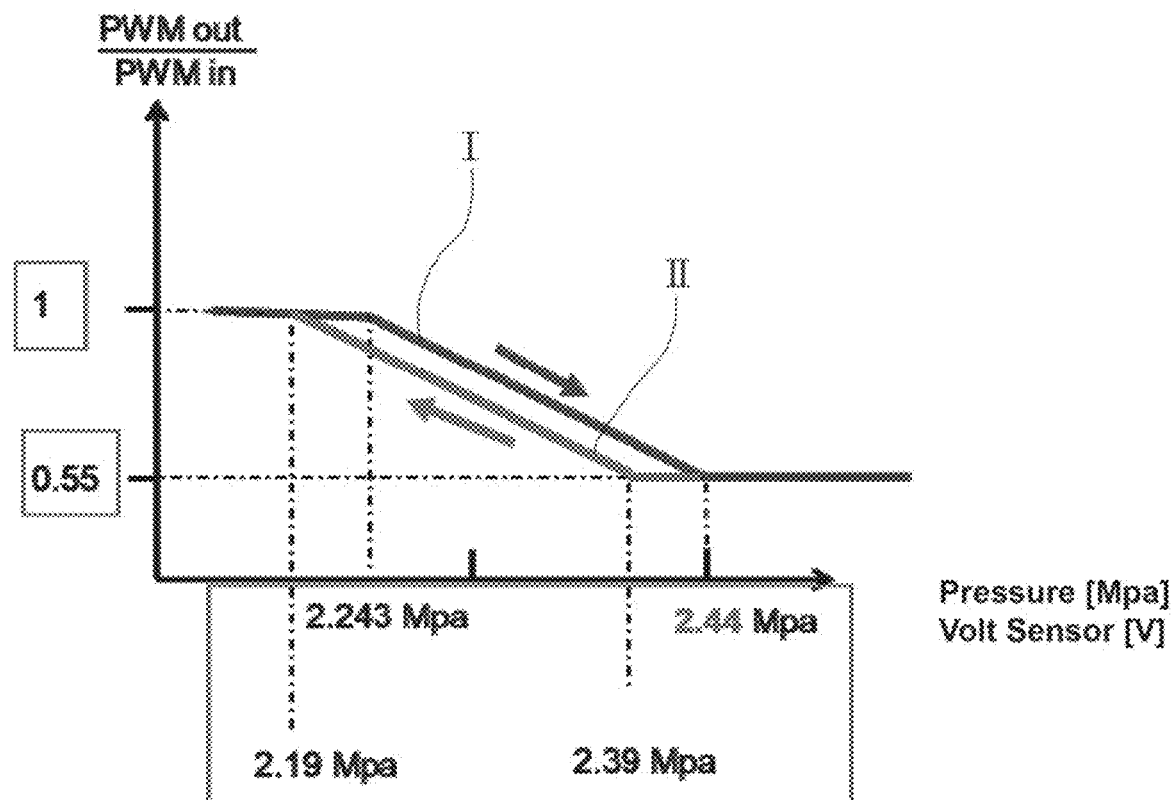
FIG. 3 is a graph representing an adjustment curve of the system according to the invention.

With reference also to FIG. 3, the control unit 20 is configured to automatically decrease the rotation speed of the fan 11 (or, in the case of more than one group, the rotation speed of at least one of the fans respectively associated with the evaporators K) when the pressure p measured by the coolant (or, in the case of more than one group, the pressures $p_1 \ldots p_K$ measured by the sensors respectively associated with the coolant circuits K) rises above a pressure threshold. In the example shown, this threshold is set to 2.19 Mpa.

The decrease of the rotation speed of the fan generates a lower air flow on the evaporator, which allows the pressure of the coolant circuit to be kept below a predetermined maximum value, depending on the characteristics of the adjustment curve of the system. For example, in the example shown in FIG. 3, the maximum preset pressure value is 2.25 Mpa, while the fan rotation speed may be reduced at most to 45% compared to the required input speed PWMin.

Specifically, the control unit is configured to generate a control signal PWMout (or, in the case of more than one group, control signals $PWMout_1 \ldots PWMout_N$), which is transmitted to the motor 12, in a manner known per se, to adjust the rotation speed of the fan 11. The control signal PWMout has a characteristic (e.g. impulse duration) proportional to the rotation speed of the fan 11. Such characteristic of the control signal PWMout follows a predetermined adjustment curve, in particular a curve with hysteresis, as a function of the pressure p measured by the pressure sensor 15, or a quantity (e.g. voltage) of the electrical signal provided by the sensor 15, proportional to the pressure p.

In the graph in FIG. 3, the adjustment curve is expressed by the ratio between the control signal PWMout output from the control unit 20 and the control signal PWMin received as input by the control unit 20 and indicative of the rotation speed request.

The adjustment curve comprises a first curve, indicated at I, and a second curve II, in which, at the same pressure (or voltage), the characteristic PWMout/PWMin of the control signal of the first curve I has a value greater than the characteristic PWMout/PWMin of the control signal of the second curve II. In the example shown, each curve I and II comprises a section with a constant value of the characteristic PWMout/PWMin, and a section wherein such characteristic varies linearly. The hysteresis cycle is between two end points, at which the curves I and II join each other. In the example shown, the first end point has an abscissa equal to 2.19 Mpa and an ordinate equal to 1 (i.e. no speed reduction with respect to the incoming control signal PWMin), and the second end point has an abscissa of 2.44 Mpa and an ordinate of 0.55 (i.e. 45% speed reduction with respect to the incoming control signal PWMin). Obviously, the values indicated above are subject to calibration as a function of the specific application for which the system is intended according to the invention.

Figure 4:
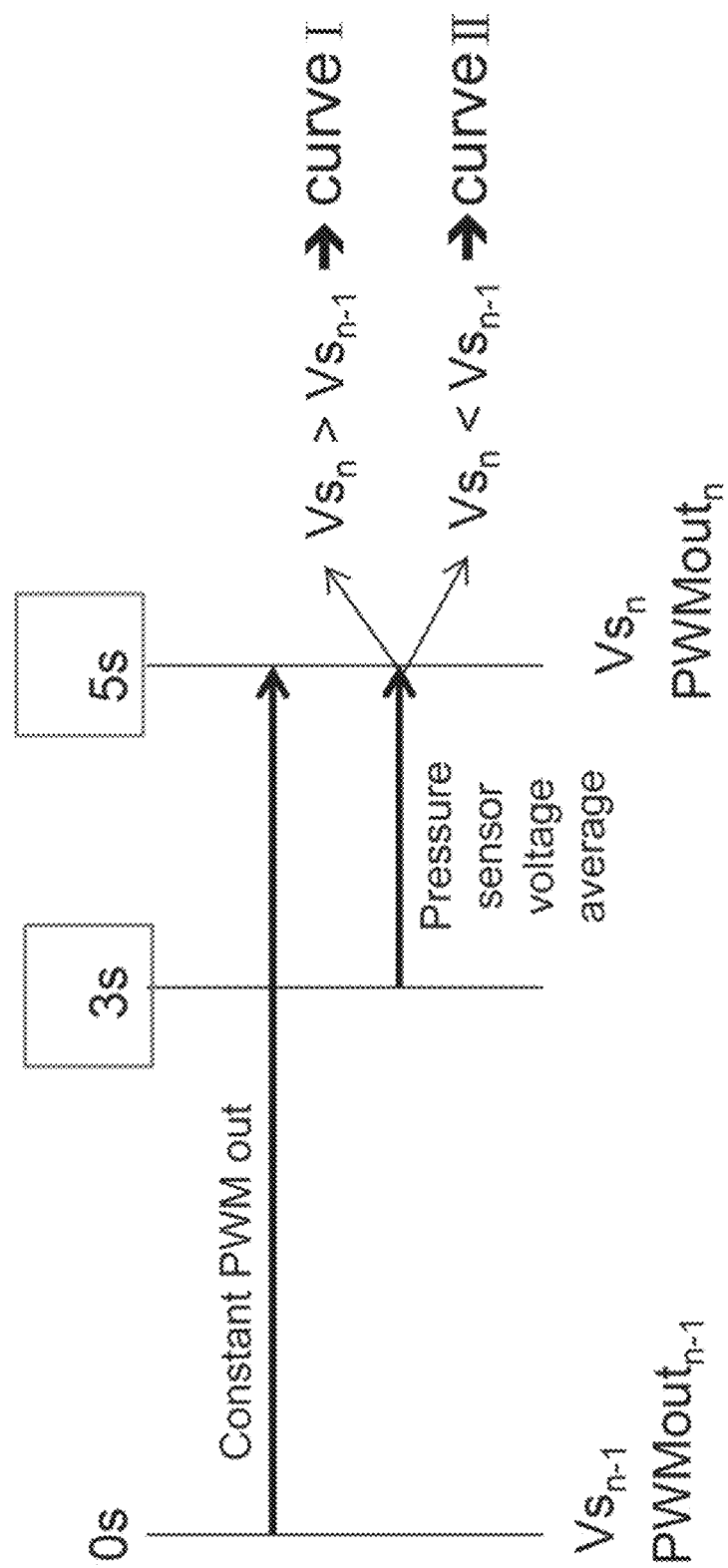
FIG. 4 is a time graph illustrating a procedure for controlling the rotation speed of the fan.

With reference also to FIG. 4, the control unit 20 is configured for calculating the average value of a signal representative of the measured pressure of the coolant in a respective time interval, comparing the average value of the signal calculated for a given time interval with the average value of the signal calculated for a prior time interval, and if the average value of the signal calculated for the given time interval is greater than the average value of the signal calculated for the prior time interval, generating a control signal according to the first curve, and if the average value of the signal calculated for the given time interval is lower than the average value of the signal calculated for the prior time interval, generating a control signal according to the second curve.

In the example shown in FIG. 4, the average value of the signal representative of the pressure corresponding to the average value of the voltage of the signal supplied by the pressure sensor 15, and is indicated at Vs. The subscripts n and n−1 used in FIG. 4 indicate that the average value $Vs_n$ is calculated over a time interval prior to the n-th instant, while the average value $Vs_{n-1}$ is calculated over an interval prior to the n−1-th instant, that is the instant 0 of the graph in FIG. 4. Similarly, the control signal PWMout emitted by the control unit 20 to adjust the speed is marked by the subscript n when it is output at the n-th instant, and the subscript n−1 when it is output at the n−1-th instant (instant 0).

The system thus applies a constant control signal PWMout over the entire time interval between the n−1-th instant and the n-th instant, which in the example shown is 5 s. The voltage values measured in a fraction of this time interval ending at the n-th instant (in the example shown, the sub-interval between 3 s and 5 s) are supplied to the control unit 20 for it to calculate the average value $Vs_n$.

The control unit 20 thus compares such average value $Vs_{n-1}$ with the average value previously calculated with respect to the time interval of equal length prior to the instant n−1 (instant 0 in FIG. 4). On the basis of such comparison, the control unit 20 then determines whether the value $PWMout_n$ to be supplied at the n-th instant should be taken from the curve I (if $Vs_n > Vs_{n-1}$) or from the curve II (if $Vs_n < Vs_{n-1}$).

The arrangements described above prevent fluctuations in the pressure of the coolant in the circuit.

Figure 5A:
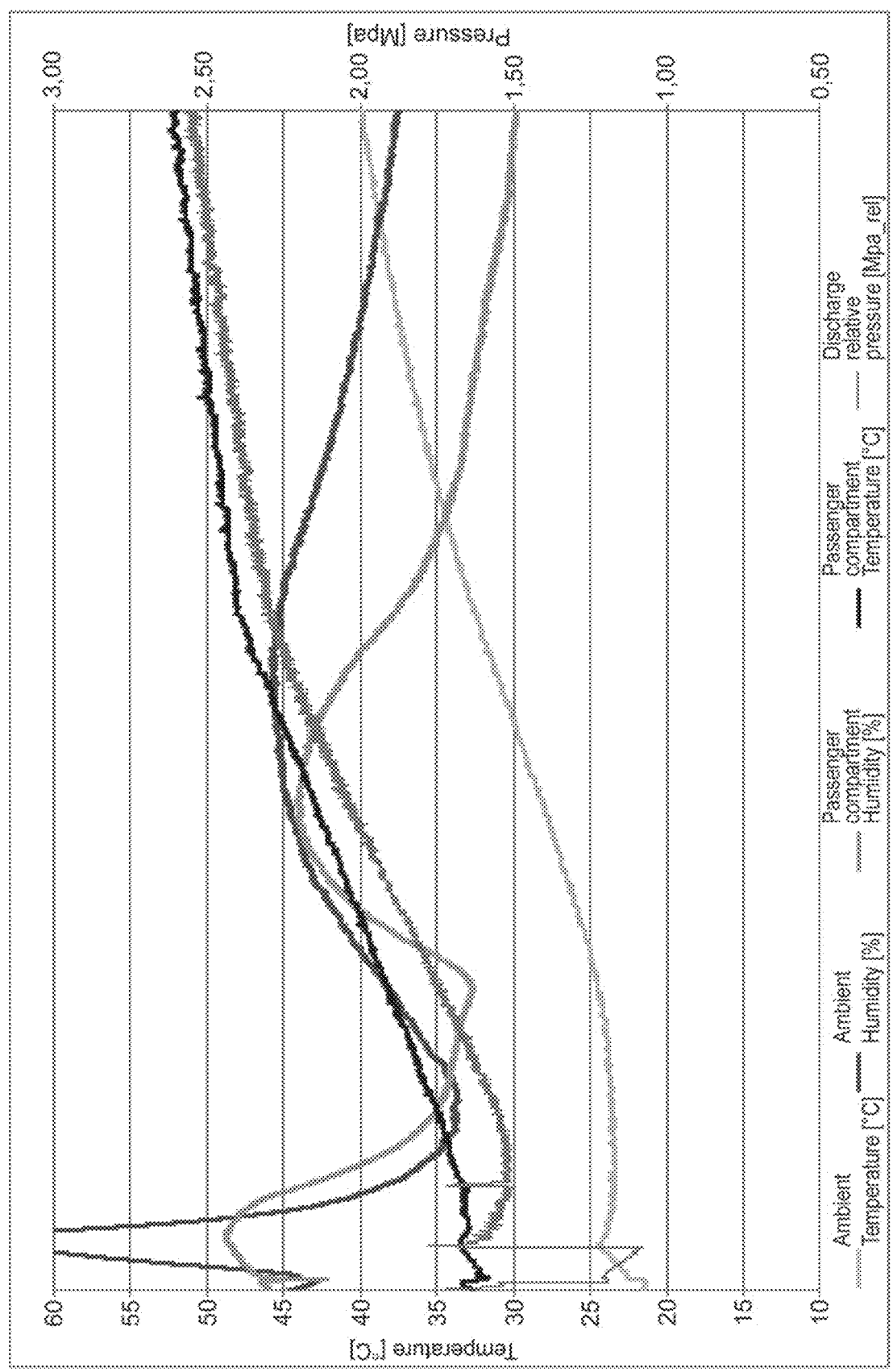
FIGS. 5*a* and 5*b* are graphs representing the time variation of some state quantities, respectively in a system without control according to the invention and in a system provided with such control.
Figure 5B:
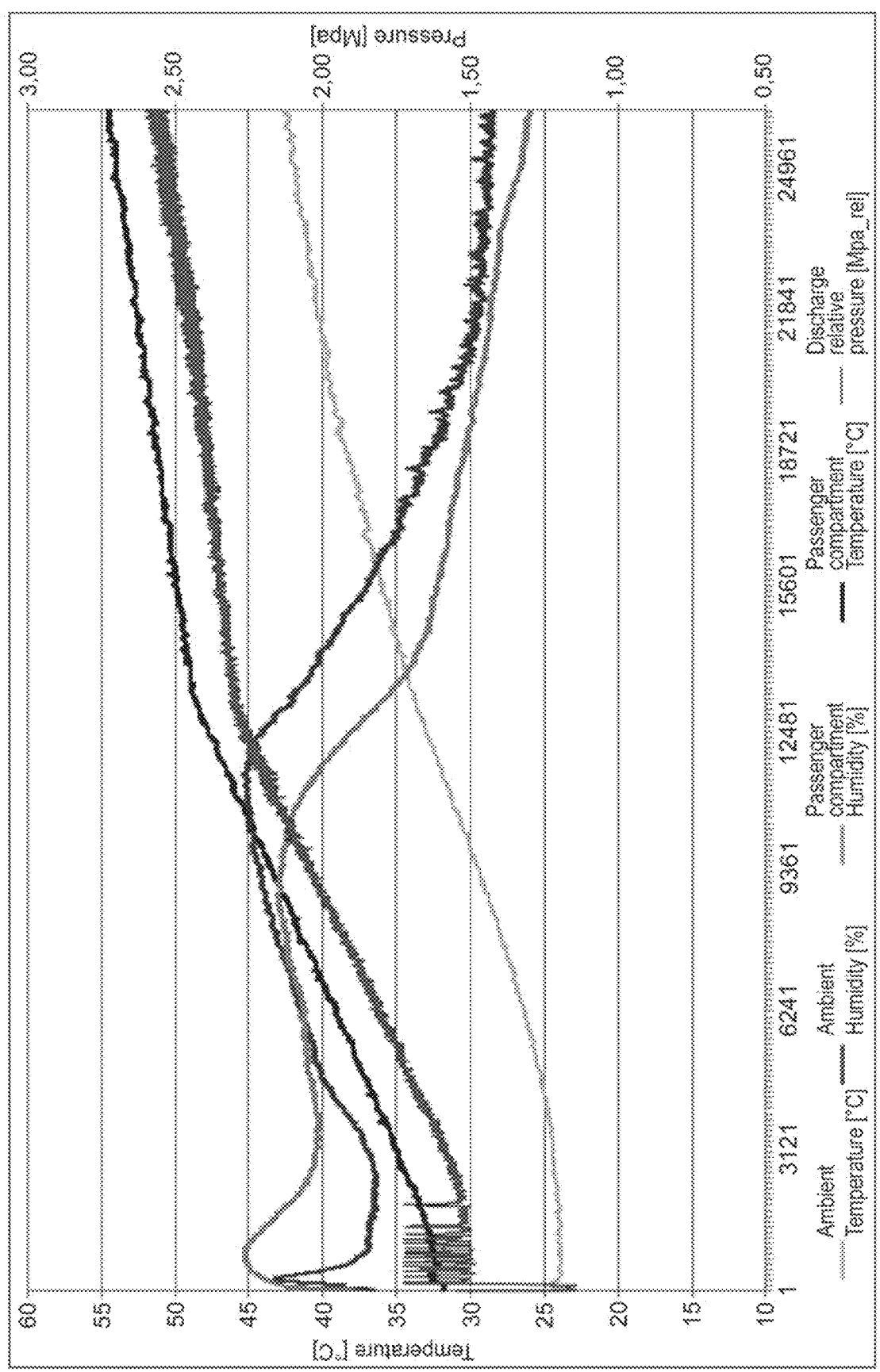

FIGS. 5a and 5b are graphs that represent the time variation of some state quantities in a shutdown test, respectively for a system without pressure control according to the invention and for a system provided with such control. The axis of the abscissa represents time, in arbitrary units, while the ordinate shows temperature and pressure.

From the comparison between the two graphs it may be observed that both systems reach the pressure corresponding to the compressor shutdown point, slightly higher than 2.50 Mpa, but with a temperature equal to about 55° C. in the system with pressure control, higher than the temperature of about 52° C. in the system without such control.

The invention claimed is:

1. An air conditioning system for a vehicle, comprising
   an evaporator configured for heat exchange between a coolant and air,
   a fan configured to generate an air flow flowing through the evaporator and intended to be fed into a passenger compartment of the vehicle,
   at least one pressure sensor configured to measure the pressure of the coolant, and provide a measurement signal representative of the measured pressure of the coolant in a plurality of time intervals, said plurality of time intervals comprising a first time interval and a second time interval, wherein said second time interval is after the first time interval, and
   a controller for adjusting the rotation speed of the fan, wherein said controller is configured to automatically decrease the rotation speed of the fan when the measurement signal rises above a pressure threshold, in such a way as to reduce the air flow on the evaporator and therefore reduce the pressure of the coolant, wherein said controller is further configured to generate a control signal for adjusting the rotation speed of the fan, said control signal having a characteristic proportional to the rotation speed of the fan, and wherein said characteristic of the control signal follows a predetermined adjustment curve as a function of the measured pressure of the coolant, wherein said adjustment curve comprises a first curve and a second curve in which, for the same pressure, the characteristic of the control signal of the first curve has a greater value than the characteristic of the control signal of the second curve, and wherein said controller is configured to
   calculate a first average value of the measurement signal over the first time interval,
   calculate a second average value of the measurement signal over the second time interval,
   compare the second average value with the first average value, and
   if the second average value is greater than the first average value, generate the control signal according to the first curve to adjust the rotation speed of the fan, and
   if the second average value is less than the first average value, generate the control signal according to the second curve to adjust the rotation speed of the fan.

2. A system according to claim 1, wherein the pressure sensor is positioned at the output of a compressor of a circuit of the coolant.

* * * * *